United States Patent
Henry et al.

(10) Patent No.: US 12,381,948 B2
(45) Date of Patent: Aug. 5, 2025

(54) P2P CONTINUITY DURING A CLIENT ROAM

(71) Applicant: Cisco Technology, Inc., San Jose, CA (US)

(72) Inventors: Jerome Henry, Pittsboro, NC (US); Matthew A. Silverman, Shaker Heights, OH (US); Malcolm M. Smith, Richardson, TX (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 18/193,456

(22) Filed: Mar. 30, 2023

(65) Prior Publication Data

US 2024/0155028 A1    May 9, 2024

Related U.S. Application Data

(60) Provisional application No. 63/382,945, filed on Nov. 9, 2022.

(51) Int. Cl.
*H04L 67/1087* (2022.01)
*H04W 72/12* (2023.01)
*H04W 88/08* (2009.01)

(52) U.S. Cl.
CPC ......... *H04L 67/1091* (2013.01); *H04W 72/12* (2013.01); *H04W 88/08* (2013.01)

(58) Field of Classification Search
CPC .... H04L 67/1091; H04W 72/12; H04W 88/08
See application file for complete search history.

(56) References Cited

U.S. PATENT DOCUMENTS

| 2016/0080504 A1 | 3/2016 | Chaturvedi et al. |
| 2016/0150443 A1 | 5/2016 | Suryavanshi et al. |
| 2016/0192343 A1 | 6/2016 | Rajamani et al. |
| 2022/0345187 A1* | 10/2022 | Merlin ................. H04W 80/02 |

FOREIGN PATENT DOCUMENTS

WO    2013029542 A1    3/2013

OTHER PUBLICATIONS

Mathias Tallberg, "P2P-based Roaming Between Home WLAN Hotspots," netlab, Year: 2006, pp. 1-6.

(Continued)

*Primary Examiner* — Brian Whipple
(74) *Attorney, Agent, or Firm* — Patterson + Sheridan, LLP (57) ABSTRACT

Techniques for improved peer-to-peer communication are provided. A roaming peer-to-peer device may identify a new access point (AP) and initiate a transition to the new AP. Initiating transition can involve sending, to the new AP, the current peer-to-peer communication schedule for approval and/or negotiating a modified peer-to-peer communication schedule with the new AP. When the roaming peer-to-peer device and the new AP agree on the peer-to-peer communication schedule, the peer-to-peer device may notify its counterpart that it has roamed to the new AP and also notify the counterpart of any updates to the peer-to-peer communication schedule.

21 Claims, 5 Drawing Sheets

(56) References Cited

OTHER PUBLICATIONS

Jay Yang et al., "TXOP Sharing for use in MU P2P," IEEE 802.11-20/1938r8 Submission, Dated: Jun. 25, 2021, pp. 1-8.
Sunghyun Hwang et al., "Multi-user Triggered P2P Transmission," IEEE 802.11-20/0967r0, Dated: Jun. 30, 2020, pp. 1-10.
Stephane Baron et al., "Direct Link MU transmissions," IEEE 802.11-19/1117r0, Dated: Jul. 15, 2019, pp. 1-11.
V. R. Cadambe and S. A. Jafar, "Interference Alignment and Degrees of Freedom of the K-User Interference Channel," in IEEE Transactions on Information Theory, vol. 54, No. 8, pp. 3425-3441, Aug. 2008, doi: 10.1109/TIT.2008.926344. [Abstract Only].
B. Lee, N. Lee, W. Shin and H. V. Poor, "Blind Interference Alignment With ISI: A New Look at OFDM for K-User Interference Channels," in IEEE Transactions on Signal Processing, vol. 68, pp. 4497-4512, 2020, doi: 10.1109/TSP.2020.3005310. [Abstract Only].

* cited by examiner

P2P CONTINUITY DURING A CLIENT ROAM

CROSS-REFERENCE TO RELATED APPLICATIONS

This application claims benefit of U.S. provisional patent application Ser. No. 63/382,945 filed Nov. 9, 2022. The aforementioned related patent application is herein incorporated by reference in its entirety.

TECHNICAL FIELD

Embodiments presented in this disclosure generally relate to peer-to-peer communications. More specifically, embodiments disclosed herein relate to peer-to-peer communications involving a roaming wireless client device.

BACKGROUND

In some wireless local area network (WLAN) deployments, such as WiFi systems, peer-to-peer (P2P) or client-to-client (C2C) mechanisms can be used to enable direct communication between devices. This can more generally be viewed as a network allowing one or more other devices to directly communicate with each other without requiring uplink/downlink from the network (e.g., without transmitting data to or receiving data from a wireless access point (AP) that provides the WLAN connectivity). Peer-to-peer support generally involves an AP allocating time slots (e.g., TXOPs) and/or resource units (RUs) for peer-to-peer stations (STAs), such as within a multiuser (MU) trigger-based physical layer protocol data unit (TB-PPDU).

Conventional approaches to peer-to-peer scheduling are generally inefficient, particularly when a STA involved in peer-to-peer communication roams out of the coverage area of its associated AP.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method, including determining, by a first peer-to-peer device associated with a first wireless access point (AP), to roam away from the first wireless AP; initiating, by the first peer-to-peer device, a transition to a second wireless AP, comprising transmitting a first peer-to-peer transmission schedule to the second wireless AP; in response to receiving an acceptance from the second wireless AP, transitioning from the first wireless AP to the second wireless AP; and performing, by the first peer-to-peer device, peer-to-peer communications with a second peer-to-peer device in accordance with the second peer-to-peer transmission schedule.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide methods, systems, and techniques for improved peer-to-peer communications involving roaming peer-to-peer devices.

In some embodiments, a peer-to-peer device may undertake one or more steps to identify a new AP that can provide better connectivity to the network (e.g., periodically, or upon determining that the peer-to-peer device is near the edge of a cell of the AP to which the peer-to-peer device is currently associated). In one embodiment, the peer-to-peer device may scan for and discover nearby APs and identify one or more APs that can support the current peer-to-peer communication schedule (also referred to in some aspects as a peer-to-peer transmission schedule) of the peer-to-peer device.

The peer-to-peer device may send a transfer request to the identified one or more APs, wherein the transfer request includes a data element describing a peer-to-peer communication schedule. The one or more APs may respond to the peer-to-peer device with an acceptance, rejection, and/or proposals for modified peer-to-peer communication schedules that they may be able to support.

In one embodiment, the peer-to-peer device and the identified one or more APs may negotiate the peer-to-peer communication schedule by exchanging proposed schedules. The peer-to-peer device may select an AP that provides the best connection to the network and/or support for the peer-to-peer communication, and complete the transition to the selected AP. In addition, in some embodiments, the peer-to-peer device may notify its counterpart in the peer-to-peer communications of the peer-to-peer device's transition to a new AP as well as any modifications to the peer-to-peer communication schedule (if any). Thereafter, the peer-to-peer communications continue as scheduled.

In some embodiments, the peer-to-peer device may seek assistance of the AP to which the peer-to-peer device is currently associated to identify a suitable AP to which the peer-to-peer device may transition. For example, in some embodiments, the peer-to-peer device may share a neighbor report of discovered APs with the currently associated AP of the peer-to-peer device. The current AP may use the neighbor report and/or its own knowledge of the network to identify one or more candidate APs for the peer-to-peer device to transition.

In one embodiment, the current AP may analyze the one or more candidate APs' ability to support the peer-to-peer communication based on, for example, the current load/traffic at the one or more candidate APs. In some embodiments, the current AP may negotiate the peer-to-peer communication schedule with the candidate APs. Upon completing such analysis, the current AP may provide the peer-to-peer device a selection of a candidate AP for transition (or a list of candidate APs along), along with a description of the neighbor APs' ability to support peer-to-peer communications, any negotiated peer-to-peer communication schedules, and the like. The peer-to-peer device may then select a new AP based on the information provided by the current AP, and proceed with transitioning to the new AP.

In some embodiments a central network controller may determine the new AP to which a roaming peer-to-peer device will transition. The central network controller may have knowledge of and manage traffic at all the APs in the network. Accordingly, the central network controller may identify APs with available resources to support the peer-to-peer communication, rebalance the load between APs, and/or negotiate the peer-to-peer communication schedule with the APs to allow for the peer-to-peer communications as the peer-to-peer device roams.

Figure 1:
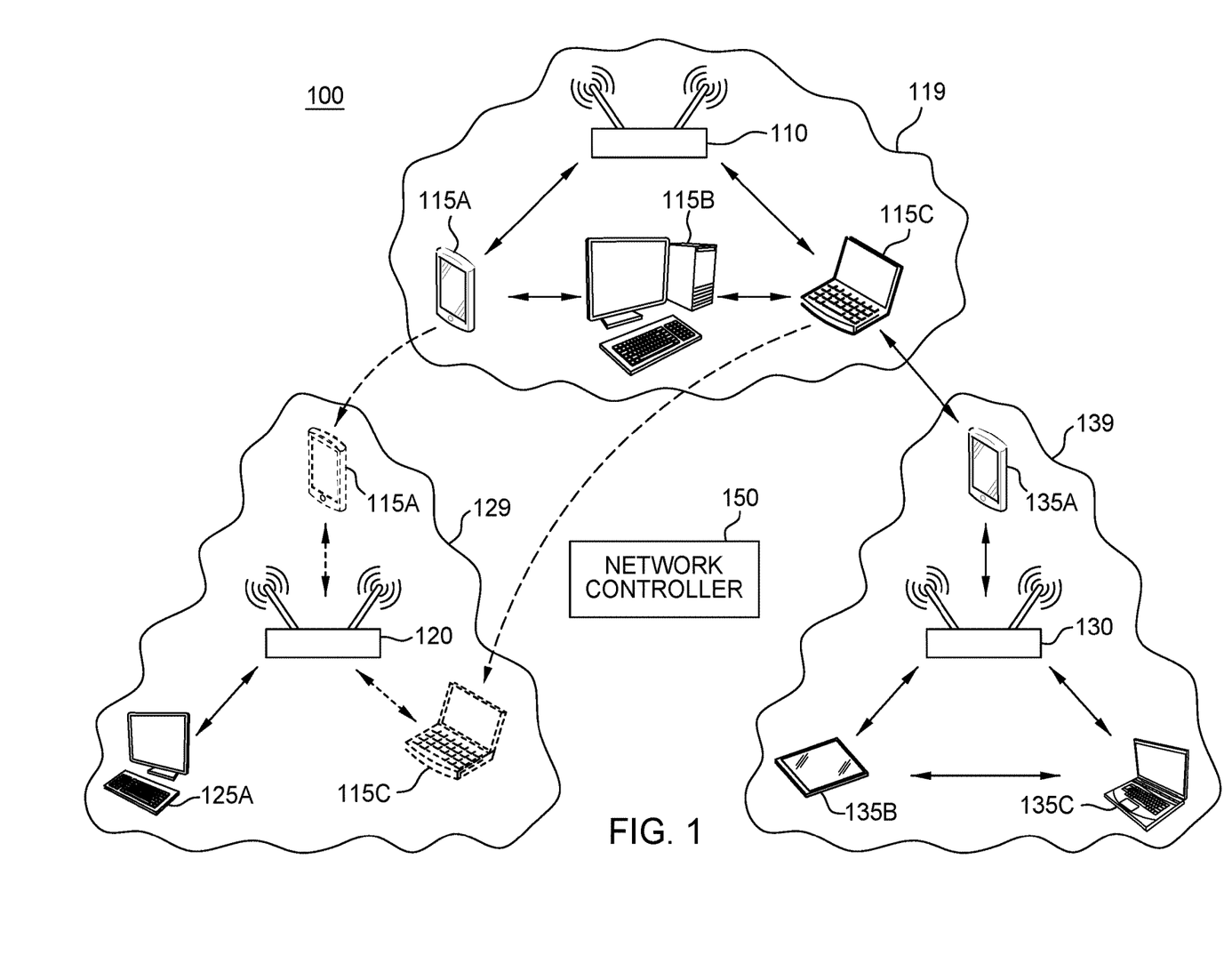
FIG. 1 depicts an example environment for peer-to-peer communication including roaming peer-to-peer devices, according to some embodiments of the present disclosure.

FIG. 1 depicts an example environment 100 for peer-to-peer communication scheduling involving roaming peer-to-peer devices, according to some embodiments of the present disclosure.

In the illustrated example, a plurality of wireless APs, e.g., the APs 110, 120 and 130, are each communicatively coupled with corresponding sets of associated wireless client devices. For example, wireless client devices 115A-C are associated with AP 110, wireless client device 125A is associated with AP 120, and wireless client devices 135A-C are associated with AP 130. "Association" with an AP, as used herein, generally means that the wireless client device has been authenticated and/or authorized by the AP, and configured with network settings that allow the wireless client device to connect to a wireless network via that AP. Wireless client devices typically associate with an AP when they are within the "cell", or coverage area, of the AP within which a sufficiently strong wireless connection can be maintained with the AP. FIG. 1 illustrates example cells 119, 129, and 139 for APs 110, 120, and 130, respectively. As a wireless client device moves towards the edge of a cell, the wireless signal between the AP and the wireless client device may weaken, thereby prompting or leading to connection with a different AP with a stronger (perceived) wireless signal.

The wireless APs 110, 120, and 130 are generally representative of an infrastructure network, such as a WLAN. Though three APs are depicted for conceptual clarity, in embodiments, there may be any number of APs. While not shown in FIG. 1, the APs 110, 120, and 130 may be communicably connected to each other in one or more ways, e.g., via Ethernet, a mesh or wireless network, or the like, thereby allowing for connectivity between wireless client devices associated with different APs. In one embodiment, a network controller 150, e.g. a WLAN controller, may manage the APs in the WLAN and provide a central point for traffic management, security policies, etc. The network controller 150 may be a stand-alone device, or in alternative embodiments, implemented as part of one of the APs 110, 120, or 130.

Generally, the AP(s) are used to provide wireless communication via the WLAN. For example, each AP may receive traffic requests from associated devices (e.g., indicating the amount of data to be transmitted, the priority of the flow, and the like). The AP may then allocate available network resources to associated devices, such as by scheduling transmissions into defined timeslots and/or portions of the spectrum. For example, within each transmit opportunity (TXOP) (also referred to in some embodiments as a transmission opportunity), the AP may assign RU(s) or physical layer protocol data units (PPDUs) to one or more connected devices, where each connected device uses the scheduled resources to transmit data to the associated AP (or to receive data from the associated AP).

The scheduled transmissions managed by the AP generally include uplink transmissions (e.g., data transmitted from one or more connected devices to the AP) and downlink transmissions (e.g., data transmitted from the AP to one or more associated devices). In some embodiments, the AP may also manage peer-to-peer transmissions between the wireless client devices. As an example, FIG. 1 illustrates peer-to-peer communications between wireless client devices 115A and 115B, wireless client devices 115B and 115C, between wireless client devices 135B and 135C, and between wireless client devices 115C and 135A.

In some embodiments, each AP can schedule the peer-to-peer transmissions by assigning each portion of the allocated spectrum or channel(s) (e.g., one or more subcarriers, such as an RU) during a defined window of time (e.g., a TXOP) to devices. That is, for each TXOP, the AP may assign the available RU(s) to one or more peer-to-peer devices, allowing each peer-to-peer device to use the assigned wireless resources, during the TXOP, to transmit data to another peer-to-peer device. For example, AP 110 may schedule RUs during TXOPs for peer-to-peer communications between wireless client devices 115A and 115B, between wireless client devices 115B and 115C, and for wireless client device 115C to communicate with unassociated wireless client device 135A. Similarly, AP 130 may schedule RUs during TXOPs for peer-to-peer communications between wireless client devices 135A and 135B, and for wireless client device 135A to communicate with unassociated wireless client device 115C.

Embodiments of the present disclosure also support maintaining peer-to-peer communication between the wireless client devices in case one or more of the wireless client devices roams from a cell of the currently associated AP to the cell of another AP. For example, as indicated by dotted lines in FIG. 1, the wireless client device 115A may be a mobile device such as a mobile phone, which may roam from the cell 119 associated with AP 110 to cell 129 corresponding to AP 120 during peer-to-peer communication with wireless client device 115B. Wireless client device 115C is similarly shown roaming from the cell 119 of AP 110 to the cell 129 of AP 120 while engaged in peer-to-peer communications with wireless client devices 115B and 135A.

In one embodiment of the present disclosure, the wireless client devices, e.g., wireless client device 115A may be configured to receive/detect signals transmitted by APs (e.g., beacon frames), and/or to send regular active or passive scanning signals, to determine the strength of the connection of the wireless client device 115A with respect to the currently associated AP and/or to detect new available APs. For example, as the wireless client device 115A moves out of the current cell 119 and into the cell 129, wireless client device 115A may determine that the connection to the AP 110 is weak by means of the beacon signals (e.g., based on the received signal strength indicator (RSSI) of the beacon(s) or other frames transmitted by the AP 110). The wireless client device 115A may also detect AP 120 and determine that a strong (or stronger, in relation to AP 110) signal is available for connecting to the network (e.g., based on the RSSI of beacons transmitted by the AP 120).

In response to determining that a stronger connection with AP 120 is available, in one embodiment, the wireless client device 115A may send a fast transfer (FT) request to establish a connection with AP 120. In one embodiment, the FT request may be sent wirelessly directly to AP 120 by the wireless client device 115A. In an alternative embodiment, the wireless client device 115A may send the FT request to AP 120 indirectly via another device communicably coupled to the wireless client device, e.g., the AP 110 or a counterpart peer-to-peer device.

In one embodiment, the FT request may include a data field describing the data communication schedule requirements or desires of the wireless client device 115A. For example, the FT request may include the TXOP schedule negotiated with, approved, and/or allocated by AP 110, the allocation of RUs to wireless client device 115A for peer-to-peer communications with wireless client device 115B and/or AP 110 or other devices, the periodicity and/or frequency of communication, scheduling identifiers associated with scheduled communications (e.g., subcarrier spacing value or identifiers, target wake time value or identifiers), or the like.

In one embodiment of the present disclosure, the FT request to AP 120 from wireless client device 115A may include a specific scheduling request related to peer-to-peer communications with wireless client device 115B. For example, the scheduling request may solicit prioritization of certain traffic (e.g., video and/or voice data) based on the Quality of Service (QoS) requirements of wireless client device 115A and/or 115B. In some embodiments, the scheduling request may indicate target start times for certain high priority or other communications.

In response to receiving the FT request from wireless client device 115A, the AP 120 may authenticate and/or authorize wireless client device 115A. Based on available resources, the AP 120 may also respond to the wireless client device 115A's indicated communication schedule or scheduling request to accommodate wireless client device 115A's peer-to-peer communication. Should AP 120 have sufficient resources, the AP 120 may simply indicate an acceptance of the communication schedule/scheduling request of wireless client device 115A. The AP 120 response may be sent wirelessly directly to the wireless client device 115A, or in alternative embodiments, indirectly via AP 110 or another peer device communicably coupled with wireless client device 115A.

If sufficient resources are not available for allocation to the peer-to-peer communications of wireless client device 115A, in some embodiments, the AP 120 may reject the scheduling request. In one embodiment, the rejection may include an indication of a reason why the scheduling request was rejected, for example, insufficient resources at the AP. In an alternative embodiment, in addition to the rejection, AP 120's response may include an alternative proposed schedule for peer-to-peer communications that the AP 120 is able to accommodate. The alternative proposed schedule may propose modifications to, for example, the target start times of the scheduled peer-to-peer communications for wireless client device 115A to avoid conflict with resources already committed by AP 120.

Should the AP 120 reject the wireless client device 115A's communication schedule/scheduling request, in one embodiment, the wireless client device 115A may opt to associate with another available AP that has available resources to accommodate the communication schedule/scheduling request. In another embodiment, the wireless client device 115A may accept the alternative schedule proposed by the AP 120 for supporting peer-to-peer communications of the wireless client device 115A with wireless client device 115B. In yet another embodiment, the wireless client device 115A may respond to the proposed alternative schedule with another modified proposed schedule, and the wireless client device 115A and AP 120 may continue to exchange proposed schedules for supporting the peer-to-peer communication until such time that they are able to agree on the schedule.

In some embodiments, the AP 120 may simply reject the schedule proposed by the wireless client device 115A and indicate a reason for the rejection, but not provide an alternative schedule. In such embodiments, the wireless client device 115A may continue to submit modified schedules until such time that the AP 120 accepts a proposed modified schedule.

Upon receiving an acceptance of the communication schedule/scheduling request from the AP 120 (whether in the first instance or after negotiation), the wireless client device 115A and AP 120 may complete the process of associating wireless client device 115A with AP 120. In one embodiment, upon receiving the acceptance from AP 120, the wireless client device 115A may notify wireless client device 115B of the new association with AP 120. Such notification may also include a description of any modifications to the peer-to-peer communication schedule.

In one embodiment, the notification may be sent to wireless client device 115B by means of an out of band direct link communication. Alternatively, the wireless client device 115A may notify wireless client device 115B by means of a non-scheduled TXOP, or the last scheduled TXOP while still associated with AP 110. In another embodiment, the wireless client device 115A may notify wireless client device 115B of the association with AP 120 (and/or any schedule modifications) by a communication sent via AP 120, which may relay the message to wireless client device 115B via AP 110. In yet another embodiment, the AP 120 may initiate the notification to wireless client device 115B after completing the association with wireless client device 115A.

After associating with AP 120 and notifying the counterparty of the wireless client device 115A (the wireless client device 115B) of the association and any modifications to the communications schedule, the peer-to-peer devices 115A and 115B may proceed with peer-to-peer communications according to the applicable communications schedule. Referring back to FIG. 1, the wireless client device 115C may follow a similar process as described hereinabove to continue peer-to-peer communications with wireless client devices 115B and 135A as the wireless client device 115C moves from the cell 119 to cell 129.

Figure 2:
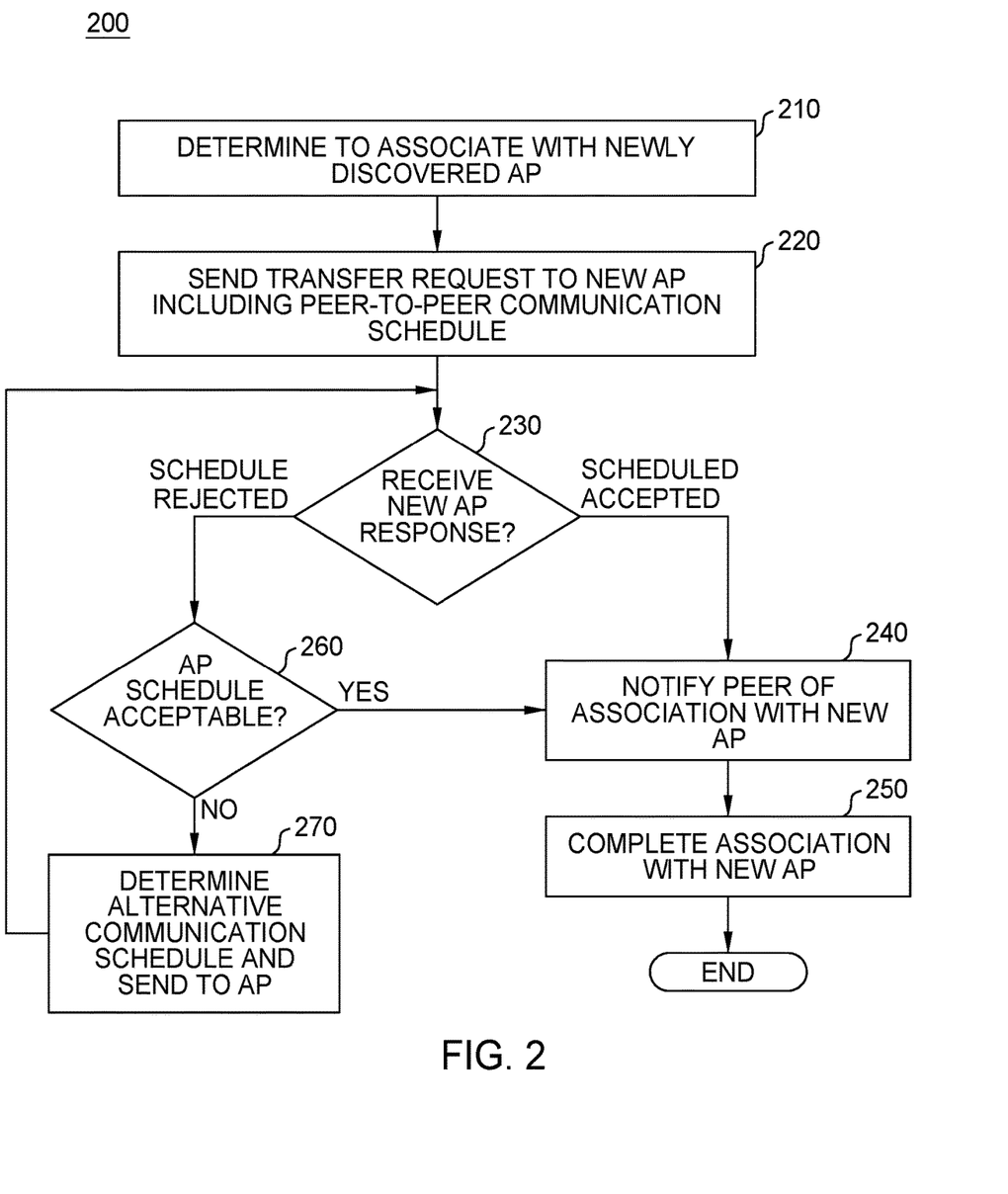
FIG. 2 is a flow diagram depicting an example of a method used by a roaming peer-to-peer device to associate with a new AP, according to some embodiments of the present disclosure.

FIG. 2 is a flow diagram depicting an example method 200 for performing peer-to-peer communication between a first peer-to-peer device and a second peer-to-peer device while the first peer-to-peer device is roaming, in accordance with some embodiments of the present disclosure. In some embodiments, the method 200 is performed by a peer-to-peer device, such as a wireless client device 115A of FIG. 1 as the wireless client device 115A roams from one cell (e.g., from an origin AP) to another (e.g., to a target AP). At block 210, the first peer-to-peer device determines that it should associate with a new AP. The first peer-to-peer device may make this determination based on, for example, scanning signals that indicate the first peer-to-peer device is transitioning from the cell of the current AP to that of a newly discovered AP, based on determining that the signal strength for the new AP is higher than the strength for the currently associated AP, and the like.

At block 220, the first peer-to-peer device may send a transfer request to the newly discovered AP to associate with the newly discovered AP. In one embodiment, the transfer request may include a communication schedule describing planned transmissions between the first peer-to-peer device and the second peer-to-peer device. As an example, the communication schedule may describe one or more of planned TXOPS/PPDUs, assigned RUs, and the like that were determined by (or negotiated with) the current AP associated with the first peer-to-peer device.

At block 230, the first peer-to-peer device may receive a response from the newly discovered AP. Should the newly discovered AP approve the communication schedule, then in block 240, the first peer-to-peer device may notify the second peer-to-peer device of the association with the newly discovered AP and the communication schedule. Then in block, 250, the first peer-to-peer device may complete association with the newly discovered AP. In an alternative embodiment, the first peer-to-peer device may first complete association with the newly discovered AP before sending the notification of block 240 to the second peer-to-peer device.

If in block 230, the newly discovered AP rejects the communication schedule, then in block 260, the first peer-to-peer device may determine whether an alternative communication schedule proposed by the newly discovered AP is acceptable. If acceptable, the first peer-to-peer device performs the steps in blocks 240 and 250. If the alternative schedule proposed by the newly discovered AP is not acceptable, then in block 270, the first peer-to-peer may determine an alternative communication schedule and send to the newly discovered AP. The method then returns to block 230 for a response from the newly discovered AP.

In some embodiments where the newly discovered AP does not propose an alternative schedule, the block 260 may be avoided. Accordingly, upon determining that the newly discovered AP has rejected the communication schedule in block 230, the method may directly move to the block 270 where the first peer-to-peer device determines the alternative schedule.

Figure 3:
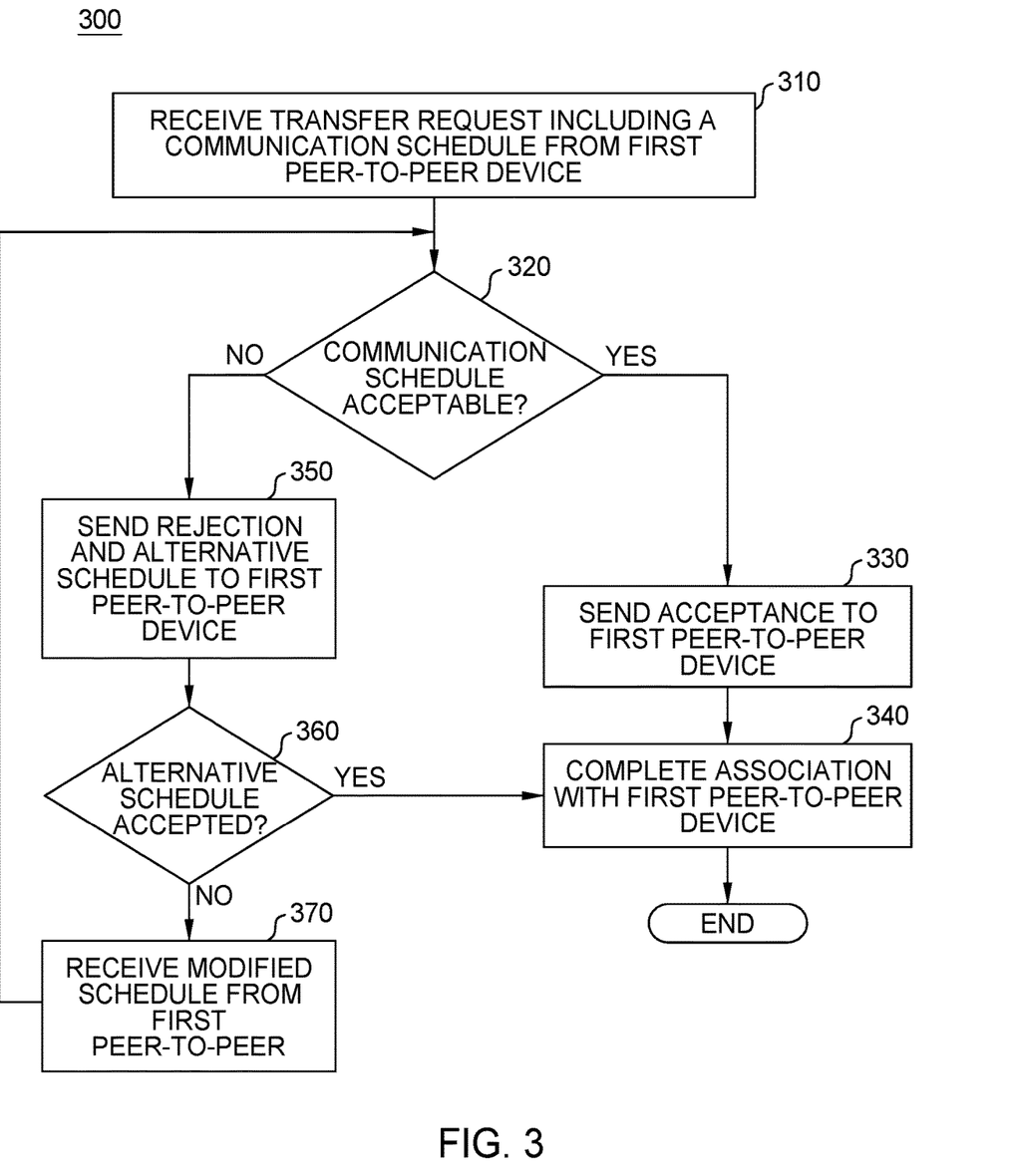
FIG. 3 is a flow diagram depicting an example of a method used by an AP to associate with a roaming peer-to-peer device, according to some embodiments of the present disclosure.

FIG. 3 is a flow diagram depicting an example method 300 performed by a first AP (also referred to in some embodiments as the target AP) to establish an association with a first peer-to-peer device that is communicating with a second peer-to-peer device. In block 310, the AP may receive a transfer request from the first peer-to-peer device. The first peer-to-peer device may be associated with a second AP (referred to in some embodiments as the origin AP) and engaged in peer-to-peer communication with the second peer-to-peer device. The second peer-to-peer device may be associated with the first AP, the second AP, a third AP, or may not be associated to any AP. The transfer request may include a planned communication schedule for the peer-to-peer communication between the first peer-to-peer and the second peer-to-peer device, where such planned communication schedule may have been established by the first peer-to-peer device and/or the second peer-to-peer device with their respective associated AP(s).

At block 320, the first AP may determine whether the planned/indicated communication schedule can (or should) be accepted by the first AP. In some embodiments, determining whether to accept the planned communication may include determining the available resources at the first AP, evaluating the potential for conflict with existing planned communications managed by the first AP, and the like.

Should the planned communication schedule be acceptable, then in block 330, the first AP may send a message of acceptance to the first peer-to-peer device (directly or indirectly, as discussed above). Then, in block 340, the first AP may complete the process for associating with the first peer-to-peer device.

Should the planned communication schedule be found acceptable in block 320, then in block 350, the first AP may send a notice of rejection to the first peer-to-peer device. In some embodiments, the first AP may include a reason for the rejection and/or an alternative schedule that the first AP is able to accommodate along with the rejection in block 350.

In block 360, the first AP may determine whether the alternative schedule proposed by the first AP is accepted by the first peer-to-peer device. If accepted, then the method moves to block 340 to complete association between the first AP and the first peer-to-peer device. If the schedule proposed by the first AP is not accepted in block 360, then in block 370, the first AP receives a modified schedule proposed by the first peer-to-peer device. Upon receiving the modified schedule in block 370, the method returns to block 320. In some embodiments, the first AP may not propose an alternative schedule along with a rejection in block 350. In such embodiments, the block 360 may be avoided, and the method may move directly from block 350 to block 370.

Referring back to FIG. 1, in one embodiment of the present disclosure, the wireless client device 115A may request the assistance of the AP 110 to find a suitable neighbor or new AP to which the wireless client device 115A can or should transition. For example, in response to determining that the wireless signal to AP 110 is weak (e.g., the RSSI of frame(s) sent by the AP 110 is below a threshold), the wireless client device 115A may send a request to AP 110 to find a new AP capable of supporting wireless client device 115A. In one embodiment, the request transmitted by the wireless client device 115A to AP 110 may include a neighbor report indicating APs that have been discovered and/or are visible/accessible by wireless client device 115A (e.g., based on scanning signals or beacons). Alternatively, the neighbor report may be sent to the AP 110 upon request.

The AP 110 may determine, either on its own and/or via the neighbor report received from wireless client device 115A, a list of candidate APs to which the wireless client device 115A can transition. In one embodiment, the AP 110 may communicate with the identified candidate AP(s) to determine their capabilities, load, ability to support the peer-to-peer communication schedule of wireless client device 115A, and the like. In one embodiment, the AP 110 may select one of the candidate APs based on analysis of the candidate APs' capabilities, and identify the selected candidate AP to the wireless client device 115A. Upon receiving the identity of the selected candidate AP from AP 110, the wireless client device 115A may proceed with association with the selected candidate AP, e.g., by performing the method of FIG. 2.

In another embodiment, the AP 110 may generate a report of capabilities of all, or a subset of, the candidate APs and share the report with the wireless client device 115A. Wireless client device 115A may use a combination of the report from AP 110 and its own analysis of nearby APs (e.g., via AP scanning algorithms) to select a candidate AP to which the wireless client device 115A should or can transition.

Figure 4:
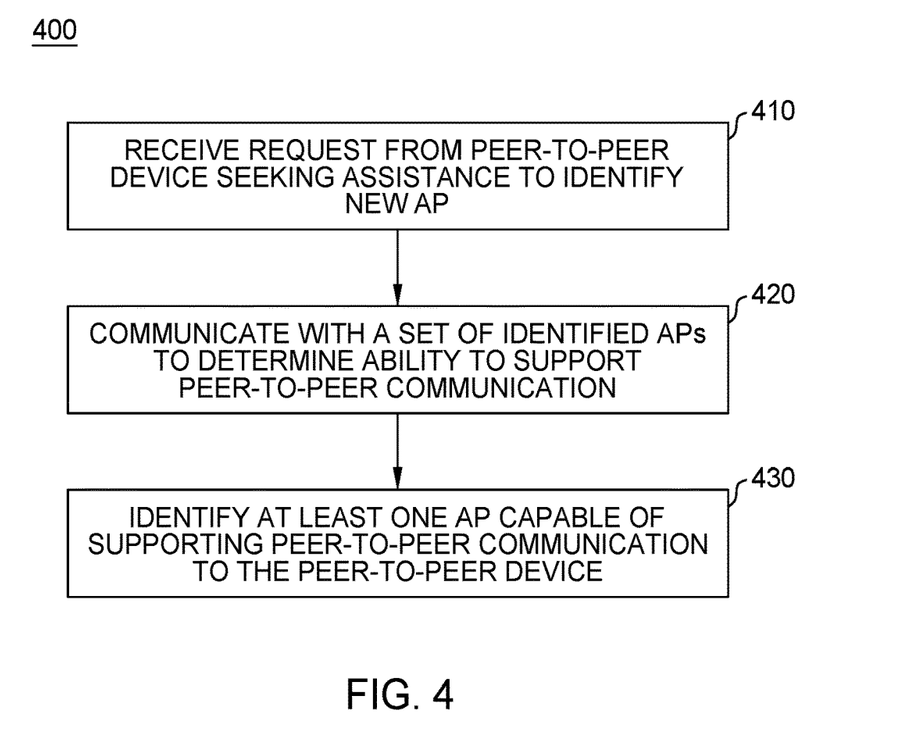
FIG. 4 is a flow diagram depicting an example of a method used by an AP to assist an associated peer-to-peer device to determine a new AP capable of supporting peer-to-peer communications, according to some embodiments of the present disclosure.

FIG. 4 is a flow diagram depicting an example method 400 performed by a current AP (referred to in some embodiments as an origin AP) to assist an associated peer-to-peer device to find a new AP (referred to in some embodiments as a target AP) to which the peer-to-peer device can transition. At block 410, the current AP may receive a request from the peer-to-peer device indicating that the peer-to-peer device needs or desires assistance with identifying a new AP. In one embodiment of the present disclosure, the request from the peer-to-peer device may include a neighbor report indicating APs discovered by the peer-to-peer device. In alternative embodiments, in response to receiving the request from the peer-to-peer device, the current AP may request the neighbor report from the peer-to-peer device. In some embodiments, the current AP may itself assess and determine potential candidate APs for transition.

In block 420, the current AP may communicate with a set of identified APs to determine the ability of the identified APs to support the peer-to-peer communications of the peer-to-peer device. Then, in block 430, the current AP may identity at least one AP capable of supporting the peer-to-peer communications to the peer-to-peer device. In some embodiments, the current AP may provide a report to peer-to-peer device, wherein the report describes the current AP's analysis of the capability of one or more of the identified APs to support the peer-to-peer communications.

In one embodiment of the present disclosure, in addition to analyzing the capabilities of one or more candidate APs to support the peer-to-peer communications, the current AP may also negotiate the peer-to-peer communication schedule with one or more candidate APs. For example, the current AP may send the current peer-to-peer communication schedule to the candidate APs and negotiate modifications to the communication schedule with one or more candidate APs. The current AP may then identify the best candidate AP for supporting the peer-to-peer communications, or send a report of negotiated communication schedules with one or more candidate APs to the roaming peer-to-peer device.

In one embodiment of the present disclosure, the current AP may use multi-link operation to negotiate the peer-to-peer communication schedule with other APs. For example, the current AP may use its secondary link to negotiate the peer-to-peer communication schedule with the one or more candidate APs, thereby allowing the current AP to continue its normal operation on the primary link while the negotiation continues on the secondary link.

In one embodiment of the present disclosure, a centralized network controller, e.g., the network controller 150 shown in FIG. 1, may participate in the selection of the candidate AP for transition. For example, in one embodiment, the wireless client device 115A may request assistance from the AP 110 to identify a new AP while roaming. The AP 110 may pass on the request from the wireless client device 115A, including, in some embodiments, a neighbor report as discussed above and/or the peer-to-peer communication schedule, to the network controller 150. Network controller 150 may be configured to manage all the APs in the network and provide a central point for traffic management.

In one embodiment of the present disclosure, the network controller may identify the AP to which the roaming wireless client device 115A can transition to based on analysis of APs capable of supporting the peer-to-peer communication. In one embodiment, the network controller 150 may negotiate the peer-to-peer communication schedule with the identified AP. In an alternative embodiment, the network controller 150 may rebalance the traffic/load at one or more APs such that the identified AP can support the peer-to-peer communication schedule or a negotiated peer-to-peer communication schedule.

Figure 5:
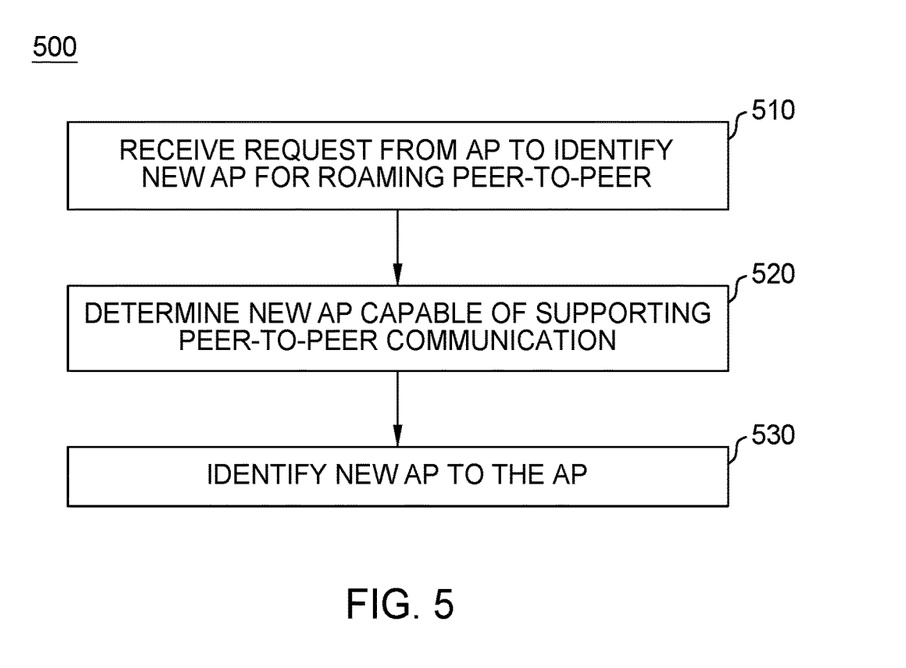
FIG. 5 is a flow diagram depicting an example of a method used by a network controller to identify an AP capable of supporting peer-to-peer communications, according to some embodiments of the present disclosure.

FIG. 5 is a flow diagram depicting an example method 500 performed by a network controller to assist a peer-to-peer device to find a new AP to transition to while roaming. At block 510, the network controller may receive a request from an AP to identify a new AP for an associated roaming peer-to-peer device. In response to receiving the request, in block 520, the network controller may determine a new AP suitable for supporting the roaming peer-to-peer device. In one embodiment, determining the new AP may be based on one or more of a neighbor report generated by the peer-to-peer device, the network controller's analysis of the network traffic and load of APs managed by the network controller, rebalancing of network traffic among the APs to accommodate the peer-to-peer communication, negotiation of the peer-to-peer communication schedule with candidate APs, and the like. In block 530, the network controller may identify the new AP (e.g., the target AP) to the requesting AP (e.g., to the origin AP), which in turn may notify the requesting peer-to-peer device.

Figure 6:
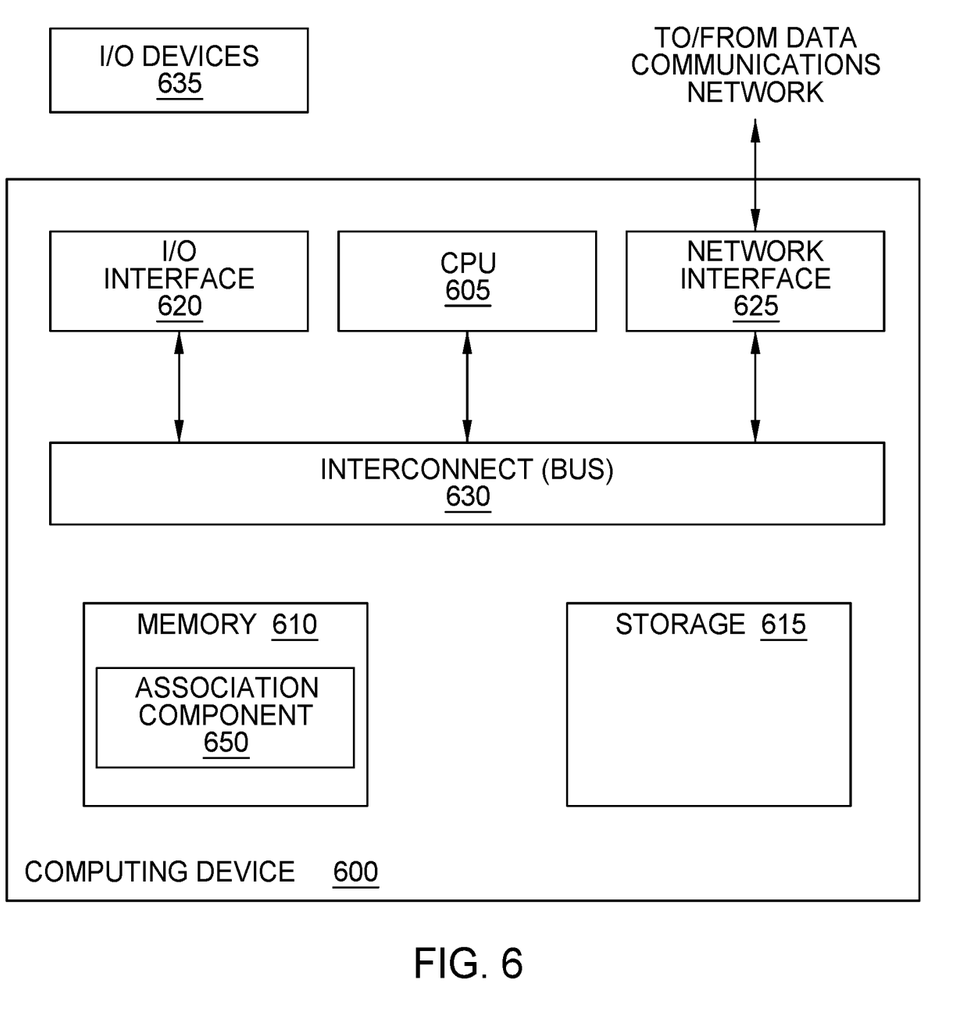
FIG. 6 depicts an example computing device configured to perform various aspects of the present disclosure, according to some embodiments of the present disclosure.

FIG. 6 depicts an example computing device 600 configured to perform various aspects of the present disclosure, according to some embodiments of the present disclosure. Although depicted as a physical device, in embodiments, the computing device 600 may be implemented using virtual device(s), and/or across a number of devices (e.g., in a cloud environment). In one embodiment, the computing device 600 corresponds to a peer-to-peer device, such as a wireless client device 115 of FIG. 1. In another embodiment, the computing device 600 corresponds to an AP, e.g., AP 110 or AP 120. In yet another embodiment, the computing device 600 corresponds to a network controller, e.g., the network controller 150.

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes an association component 650, which may perform one or more embodiments discussed above. Although depicted as a discrete component for conceptual clarity, in embodiments, the operations of the depicted component (and others not illustrated) may be combined or distributed across any number of components. Further, although depicted as software residing in memory 610, in embodiments, the operations of the depicted component (and others not illustrated) may be implemented using hardware, software, or a combination of hardware and software.

In one embodiment, the association component 650 may be used to determine association between APs and peer-to-peer devices, as discussed above. For example, the association component 650 may send or receive requests for association with APs generated by roaming peer-to-peer devices. The association component 650 can then identify candidate APs, analyze capabilities of candidate APs, negotiate the peer-to-peer communication schedule, and the like, as described above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, by a first peer-to-peer device associated with a first wireless access point (AP) and from the first wireless AP, acceptance of a first peer-to-peer transmission schedule;
determining, by the first peer-to-peer device, to roam away from the first wireless AP;
initiating, by the first peer-to-peer device, a transition to a second wireless AP, comprising transmitting the first peer-to-peer transmission schedule to the second wireless AP;
in response to receiving an acceptance from the second wireless AP, transitioning from the first wireless AP to the second wireless AP; and
performing, by the first peer-to-peer device, peer-to-peer communications with a second peer-to-peer device in accordance with the first peer-to-peer transmission schedule.

2. The method of claim 1, wherein the acceptance comprises an acceptance of the first peer-to-peer transmission schedule.

3. The method of claim 1, further comprising:
receiving from a third wireless AP, a rejection of the first peer-to-peer transmission schedule; and
negotiating with the third wireless AP to determine a second peer-to-peer transmission schedule.

4. The method of claim 1, further comprising notifying the second peer-to-peer device regarding the transition, by the first peer-to-peer device, to the second wireless AP.

5. The method of claim 1, further comprising:
requesting, from the first wireless AP, assistance with identifying an AP for transition; and
receiving, from the first wireless AP, an indication of at least one AP for transition.

6. The method of claim 5, wherein the first wireless AP identifies the at least one AP for transition based on capability of the at least one AP of supporting the first peer-to-peer transmission schedule.

7. The method of claim 5, wherein the first wireless AP negotiates a second peer-to-peer transmission schedule with the at least one AP for transition.

8. The method of claim 1, wherein the second wireless AP is identified by a central network controller that manages the first wireless AP and the second wireless AP.

9. The method of claim 1, further comprising, prior to initiating the transition to the second wireless AP, initiating a transition to a third wireless AP, wherein:
the first wireless AP facilitates the transition to the third wireless AP by transmitting the first peer-to-peer transmission schedule to the third wireless AP, and
the first peer-to-peer device selects the second wireless AP in response to receiving, from the third wireless AP, rejection of the first peer-to-peer transmission schedule.

10. A non-transitory computer-readable medium containing computer program code that, when executed by operation of one or more computer processors, performs an operation comprising:
receiving, by a first peer-to-peer device associated with a first wireless access point (AP) and from the first wireless AP, acceptance of a first peer-to-peer transmission schedule;
determining, by the first peer-to-peer device, to roam away from the first wireless AP;
initiating, by the first peer-to-peer device, a transition to a second wireless AP, comprising transmitting the first peer-to-peer transmission schedule to the second wireless AP;
in response to receiving an acceptance from the second wireless AP, transitioning from the first wireless AP to the second wireless AP; and
performing, by the first peer-to-peer device, peer-to-peer communications with a second peer-to-peer device in accordance with the first peer-to-peer transmission schedule.

11. The non-transitory computer-readable medium of claim 10, the operation further comprising:
receiving from the second wireless AP a rejection of the first peer-to-peer transmission schedule; and
negotiating with the second wireless AP to determine a second peer-to-peer transmission schedule.

12. The non-transitory computer-readable medium of claim 10, the operation further comprising:
requesting, from the first wireless AP, assistance with identifying an AP for transition; and
receiving, from the first wireless AP, an indication of at least one AP for transition.

13. The non-transitory computer-readable medium of claim 12, wherein the first wireless AP identifies the at least one AP for transition based on capability of the at least one AP of supporting the first peer-to-peer transmission schedule.

14. The non-transitory computer-readable medium of claim 12, wherein the first wireless AP negotiates a second peer-to-peer transmission schedule with the at least one AP for transition.

15. The non-transitory computer-readable medium of claim 10, wherein the second wireless AP is identified by a central network controller that manages the first wireless AP and the second wireless AP.

16. A system, comprising:
one or more computer processors; and
a memory containing a program which when executed by the one or more computer processors performs an operation, the operation comprising:
receiving, by a first peer-to-peer device associated with a first wireless access point (AP) and from the first wireless AP, acceptance of a first peer-to-peer transmission schedule;
determining, by the first peer-to-peer device, to roam away from the first wireless AP;
initiating, by the first peer-to-peer device, a transition to a second wireless AP, comprising transmitting the first peer-to-peer transmission schedule to the second wireless AP;
in response to receiving an acceptance from the second wireless AP, transitioning from the first wireless AP to the second wireless AP; and performing, by the first peer-to-peer device, peer-to-peer communications with a second peer-to-peer device in accordance with the first peer-to-peer transmission schedule.

17. The system of claim 16, the operation further comprising:
receiving from the second wireless AP a rejection of the first peer-to-peer transmission schedule; and
negotiating with the second wireless AP to determine a second peer-to-peer transmission schedule.

18. The system of claim 16, the operation further comprising:
requesting, from the first wireless AP, assistance with identifying an AP for transition; and
receiving, from the first wireless AP, an indication of at least one AP for transition.

19. The system of claim 18, wherein the first wireless AP identifies the at least one AP for transition based on capability of the at least one AP of supporting the first peer-to-peer transmission schedule.

20. The system of claim 18, wherein the first wireless AP negotiates a second peer-to-peer transmission schedule with the at least one AP for transition.

21. The system of claim 16, wherein the second wireless AP is identified by a central network controller that manages the first wireless AP and the second wireless AP.

* * * * *